United States Patent Office 3,512,952
Patented May 19, 1970

3,512,952
APPARATUS FOR SEALING VITREOUS COMPONENTS OF AIRTIGHT VESSELS
Hidehiko Yoshida, Chigasaki-shi, Masahiko Enomoto, Yokohama-shi, and Kojiro Sumi, Tokyo, Japan, assignors to Tokyo-Shibaura Electric Co., Ltd., Kawasaki-shi, Japan, a corporation of Japan
Filed Sept. 21, 1967, Ser. No. 669,526
Claims priority, application Japan, Oct. 8, 1966, 41/66,221
Int. Cl. C03b 29/00
U.S. Cl. 65—271
2 Claims

ABSTRACT OF THE DISCLOSURE

An apparatus for sealing the vitreous components of an airtight vessel wherein a pair of rigid members are arranged opposite to each other with marginal portions of the vitreous components to be sealed lying between them and also in a manner to come close to and go away from each other, at least one of these rigid members is hollow and has a plurality of nozzle holes to eject burner flames from the hollow space of the rigid members toward the marginal portions of the vitreous components and a suitable number of auxiliary nozzle holes adapted to eject fluid fuel to receive a flame from said burner flame and to keep a pilot flame burning during at least the sealing operation by said rigid members.

---

This invention relates to an apparatus for sealing an airtight vitreous vessel, more particularly to an apparatus for sealing at the marginal portions two vitreous components to make an airtight panel vessel such as the envelope of a fluorescent panel lamp of the type described in U.S. Pat. 3,252,781, for example.

When an airtight vessel is fabricated by assembling two vitreous components, the components are generally sealed together at their marginal portions. In such sealing, the marginal portions of the two components to be sealed are heated by burner flames applied thereto or by electric current to temperatures at which the glass of the marginal portions exhibits a plastic flow, then the two components are pressed together along their marginal portions by a pair of appropriate cooperating dies or molds in such a manner that the components are hermetically sealed. For instance, where the envelope of a fluorescent panel lamp is sealed, there are assembled a back plate which is provided with a discharge channel formed from a plurality of parallel grooved sections extending side by side and connected in series at the alternate ends, and a face plate bearing shallow square embossments, in such a maner that these two plates are aligned at their marginal portions. The marginal portions of one or both of the plates is heated uniformly, for example, by a plurality of burners. After the margins are softened the burner flames are removed, both plates are pressed together along their margins so that they are sealed hermetically to each other.

To heat the marginal portions of vitreous components, there is generally used a burner assembly comprising a plurality of burners of precise construction. The thermally softened margins are pressed together by a pair of molds or dies.

The present invention provides an apparatus for sealing the vitreous components of an airtight vessel, which comprises a pair of rigid members having a configuration corresponding to that of the seal parts of these components, at least one of these rigid members being hollow and having nozzle holes on the side facing said components. Desirably, nozzle holes are provided in both rigid members.

The hollow portion within the rigid members is connected to a device to supply fluid fuel such as coal gas, and the fuel introduced into the hollow rigid members is directed to the seal parts as burner flames through the nozzle holes. Concurrently, the rigid members act as a pair of cooperating dies to press together the seal parts of the heated components by being brought close to each other.

Figure 1:
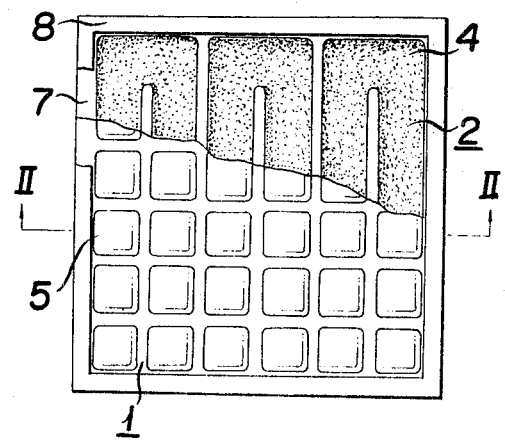
FIG. 1 is a plan view, partly cut away, of the sealing apparatus according to this invention designed for hermeticaly sealing together the face plate and back plate of a fluorescent panel lamp at the margins thereof.
Figure 2:
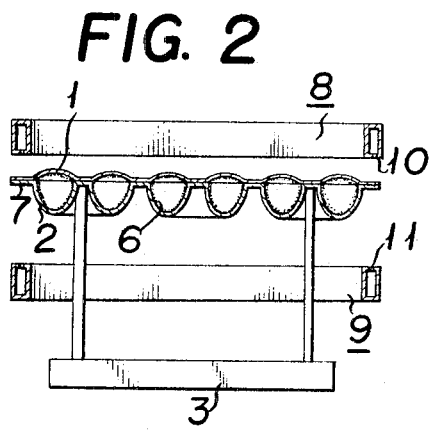
FIG. 2 is a sectional view taken along the line 2—2 of FIG. 1.

Referring now to the accompanying drawing, more particularly to FIGS. 1 and 2, numerals 1 and 2 respectively represent a rectangular face plate and a back plate constituting the vitreous envelope of a fluorescent panel lamp, the envelope being held horizontally on a support member 3.

Provided with the back plate 2 are six parallel grooved sections connected in series at the alternate ends. The face plate 1 includes a plurality of rectangular shallow embossments 5 to improve the appearance of the finished lamp and the uniformity of light distribution of the lamp when the lamp is on. Before the face plate and back plate constituting the vitreous envelope of the lamp are sealed together, a fluorescent substance 6 is coated all over the inner surface of the discharge channel-way.

Placed above and below the vitreous envelope of the lamp held horizontally on support member 3 are a pair of rigid members 8 and 9, one on each side, in such a manner that the circumferences of the rigid members are set exactly opposite to the marginal portion 7 of the vitreous envelope. The rigid member 8 located above the envelope has a square shape to match the configuration of the latter, and consists of a hollow body having a rectangular cross section, and also has a plurality of orifices or burner holes 10 which are spaced apart to each other with a prescribed space and perforated on the underside of the rigid member. The rigid member 9 below the vitreous components is of substantially the same construction as the upper rigid member 8, and perforated with a plurality of burner holes 11 on the upper side. These rigid members are supported by an appropriate drive means (not shown) in such a manner that one or both of them can be moved to come close to and go away from the other, and the hollow spaces of the rigid members 8 and 9 are connected to an adequate fluid fuel supplying device (not shown), whereby the fuel introduced under pressure from this supplying device is ejected as burner flames from the burner holes 10 and 11.

In operating the apparatus of the present invention, two rigid members 8 and 9 are respectively placed at the prescribed space on both sides of the vitreous components to be sealed. Fluid fuel such as coal gas transferred into the rigid members at a controlled pressure from the supplying device is jetted from the burner holes 10 and 11, and fired to form a plurality of burner flames.

When the burner flames heat the glass of the marginal portion 7 of the vitreous envelope to temperatures at which it exhibits a plastic flow, both rigid members 8 and 9 are moved near to each other in a manner to press the marginal portion 7. Where only one of the rigid members is movable, the vitreous envelope is lifted or lowered by support 3 until one side of the marginal portion 7 thereof comes in contact with the other immovable member, and the movable member is transferred so as to contact with the other side of the marginal portion 7.

Figure 3:
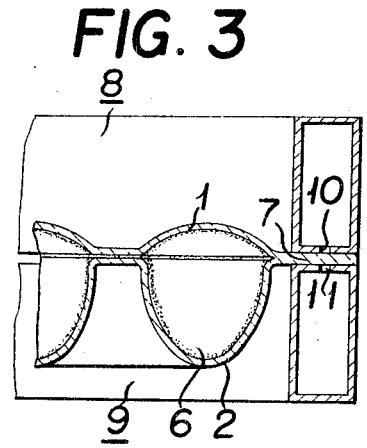
FIG. 3 shows an enlarged longitudinal section of a portion the back plate and face plate press sealed at the margins by the apparatus illustrated in FIGS. 1 and 2.

As clearly seen from FIG. 3, when pressed by the rigid members 8 and 9 the marginal portion 7 of the vitreous components is formed into a uniform and strong seal due to the fusion of the glass of the components. At the time of this press seal, the nozzle holes 10 and 11 provided in rigid members 8 and 9 respectively are plugged with the surface of the marginal portion 7 of the vitreous envelope, extinguishing the burner flames ejected from these nozzle holes. Consequently when, upon completion of the sealing of the vitreous envelope, the rigid members are removed from the sealed margin, and fluid fuel is again jetted from the nozzle holes 10 and 11, then it is necessary to fire the fuel by a proper igniting means such as a pilot burner. Preferably, feeding of fuel is intercepted immediately before the rigid members are brought in contact with the surface of the margin of the envelop. The sealed envelope is taken out of the sealing apparatus and a new set of vitreous envelope to be sealed is placed on the support 3, thus repeating the sealing cycle.

Figure 4:
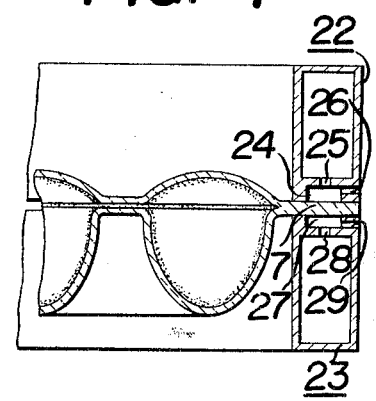
FIG. 4 is a similar view to FIG. 3 showing another embodiment of the sealing apparatus according to this invention.

FIG. 4 illustrates one modification of this invention in which improvement in the nozzle holes of the rigid member has been made. As in the preceding embodiment, the sealing apparatus in this modification comprises a pair of rigid members formed in a square configuration 22 and 23 so as to match the marginal configuration of the vitreous envelope of a fluorescent panel lamp.

The upper rigid member 22 is hollow and has a rectangular cross section, the underside being provided with a plurality of cavities 24, for example, circular cavities in plan view at the prescribed space.

The cavity of the upper rigid member 22 is connected to the hollow space through nozzle hole 25 perforated through the lower wall of the rigid member 22. The cavities are also connected to the outside through an auxiliary nozzle hole 26 penetrating through the outer wall of the rigid member 22. The lower rigid member 23 is of substantially the same construction as the upper one, namely, provided with a plurality of cavities 27, nozzle holes 28 and auxiliary nozzle holes 29. In this modification, at least one of these rigid members is movably supported as in the preceding embodiment. The hollow spaces of the rigid members 22 and 23 are connected to a fluid fuel supply means (not shown) through a flow rate control device such as a valve.

In the initial stage of heating, when the rigid members 22 and 23 are kept apart at the prescribed space from the surface of the marginal portion 7 to be sealed, the fluid fuel is ejected from the nozzle holes through the hollow spaces of the rigid members 22, 23 to form burner flames directed to the surface of the marginal portion. After the margin has been heated to appropriate temperatures, the rigid members are moved near to each other till their peripheral edges touch both faces of the margin 7, and the openings of the cavities 24 and 27 of the respective rigid members 22, 23 are blocked with the margin 7. In this condition, as described above, since the cavities 24, 27 have auxiliary nozzle holes 26, 29 respectively, penetrated through the side walls of the rigid members, when the cavity opening is plugged with the margin 7, the fluid fuel introduced into the cavities is directed to by-pass through the auxiliary nozzle holes toward the outsides of the rigid members, thus enabling the burner flames to continue to burn.

When, upon completion of the sealing of the vitreous components, the peripheral edges of the rigid members are removed from the margin of the vitreous components, then the burner flames which have kept burning in the auxiliary nozzle hole will again run straight through the cavity from the main nozzle hole. According to this modification, therefore, the burner flames are maintained even during sealing process, thus eliminating the occurrence of backfires occurred when fuel supply is suspended or reopened.

In the aforementioned modification, the auxiliary nozzle is formed at cavity by penetrating the outer peripheral wall of the rigid member, but if desired, said auxiliary nozzle can be formed at cavity by penetrating the inner peripheral wall of the rigid member.

Figure 5:
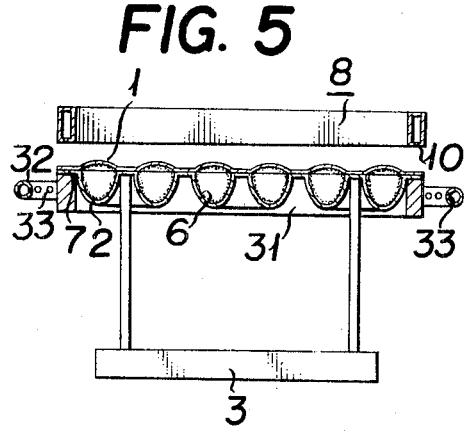
FIG. 5 is a longitudinal sectional view of a further embodiment of the sealing apparatus according to this invention.

FIG. 5 illustrates a further modification of the sealing apparatus according to this invention which includes a lower rigid member containing no nozzle holes, in which the same parts as those shown in FIGS. 1 to 3 are indicated by the same reference numerals and description thereof is omitted. More particularly, the lower rigid member 31 is formed into a square shape with a planar upper surface so as to match the marginal configuration of the vitreous envelope to be sealed, and is of a heat resistant material having a rectangular cross section. Around the lower rigid member 31 is arranged an appropriate heating means to heat it to temperatures at which the vitreous components placed in contact with it would be softened. The heating means comprise, for example, an annular burner 32 having a plurality of nozzle holes 33 arranged surround the rigid member 31 at an appropriate distance from the outer side wall thereof, whereby the vitreous components are indirectly heated by the heated rigid member 31 when the flames are ejected from the nozzle holes 33 of the burner 32.

In sealing operation, the marginal portion 7 of the vitreous envelope to be sealed is positioned so as to come in contact with the upper surface of the lower rigid member 31, and the upper rigid member 8 is located above the envelope. In such positional interrelations, after flames are ejected to heat the lower rigid member from the nozzle holes 33 of the annular burner 32 toward the side walls of the rigid member, burner flames are jetted from the nozzle holes 10 of the upper rigid member to the upper surface of the marginal portion 7 of the vitreous envelope. Thus the marginal portion 7 is heated from above and below by the burner flames of the upper rigid member 8 and the heat conducted from the lower rigid member 31. When the marginal portion reaches the suitable temperature for sealing the upper rigid member is lowered so as to press the marginal portion 7 between the underside thereof and the upper surface of the lower rigid member. After the face plate 1 and back plate 2 of the vitreous envelope are pressed together at their margins so as to complete a lamp envelope, the upper rigid member 8 is raised to leave the upper surface of the margin 7 and the envelope thus sealed is raised by support 3 up to a position at which the envelope does not come in contact with either of the rigid members when the envelope is moved in the horizontal direction. Thereafter the sealed envelope is moved from the sealing apparatus to the next apparatus for finishing a fluorescent panel lamp.

While the above description has been made with apparatus for sealing the vitreous envelope of a fluorescent panel lamp, it will be understood clearly that this invention can be applicable in the apparatus for sealing of the vitreous envelope of a flat airtight vessel other than the envelope of the aforesaid fluorescent panel lamp. In the sealing of any type of envelope, this invention offers a simple mechanism and is capable of completing a constantly firm seal.

What is claimed is:
1. In an apparatus for sealing the vitreous components of an airtight vessel, which includes a pair of rigid members having peripheral edge sections matching the configuration of corresponding marginal portions of an air- tight vessel to be sealed, said rigid members being arranged opposite each other, at least one of said rigid members being movable so as to come close to and go away from the other rigid member and a support to hold said vitreous components between said rigid members, the improvement which comprises: providing at least one of said rigid members with a plurality of channel shaped annular cavities in its hollow peripheral edge section, with a facing wall facing said vitreous components and an outer side wall, there being a plurality of nozzle holes provided in said facing wall so as to jet fluid fuel introduced into said hollow peripheral edge section towards said vitreous component marginal portions to heat said marginal portions and means defining an auxiliary nozzle hole extending from each of said channel shaped cavities through said outer side wall to allow fuel to by-pass during sealing and to avoid flame extinguishment during sealing.

2. The apparatus claimed in claim 1 wherein one of said rigid members is solid and has at the outer periphery a heating means to heat at least one surface thereof facing said vitreous component marginal portions.

References Cited
UNITED STATES PATENTS

| | | | |
|---|---|---|---|
| 2,334,604 | 11/1943 | Bunger | 65—271 |
| 3,252,781 | 5/1966 | Christy | 65—155 |

S. LEON BASHORE, Primary Examiner

J. H. HARMAN, Assistant Examiner

U.S. Cl. X.R.
65—57, 155, 244